S. Perry,
Horse Power.
N° 39,325.  Patented July 21, 1863.
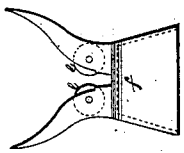
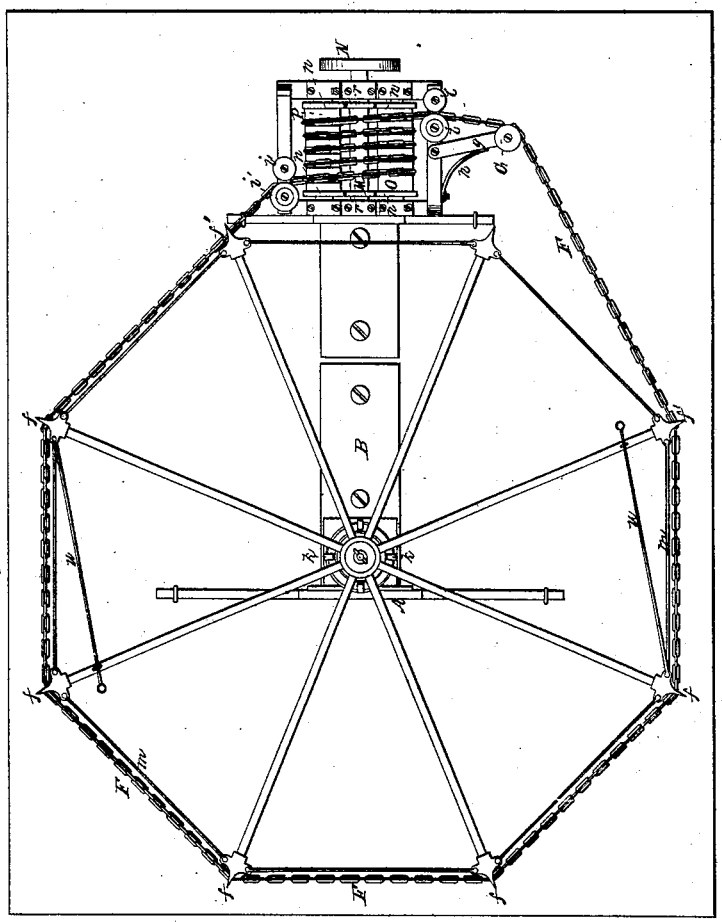
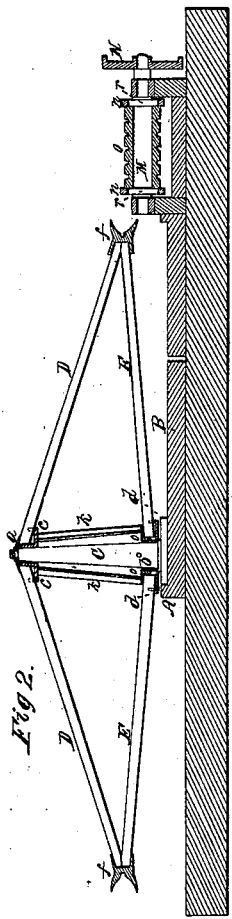
Witnesses.
Inventor

UNITED STATES PATENT OFFICE.

STUART PERRY, OF NEWPORT, NEW YORK, ASSIGNOR TO C. H. A. CARTER, OF NEW YORK CITY.

IMPROVEMENT IN HORSE-POWERS.

Specification forming part of Letters Patent No. 39,325, dated July 21, 1863.

*To all whom it may concern:*

Be it known that I, STUART PERRY, of Newport, in the county of Herkimer and State of New York, have invented certain new and useful Improvements in Circuit Horse-Powers; and I do hereby declare the following to be a full, clear, and exact description of the same, reference being had to the accompanying drawings, making a part of this specification, in which—

Figure 1 represents a top plan of the horse-power. Fig. 2 represents a longitudinal vertical section; and Fig. 3 represents, on an enlarged scale, one of the forks thereof upon which the endless chain works.

This invention relates to that class of horse-powers known as "circuit horse-powers," and its leading characteristic consists in the manner in which the power of the team is transmitted through the endless chain, which is drawn around by the team, to a drum, wheel, or pulley, from whence it is transmitted to any machinery to be driven by it; and it further consists in providing the forks, which take and carry around the chain, with a constantly-changing surface or bearing, so that they will not be cut or so much worn by the chain.

To enable others skilled in the art to make and use my invention, I will proceed to describe the same with reference to the drawings.

A B represent a base on which the horse-power is set and supported through or by means of a shaft, C, permanently fixed thereon. The sprocket-wheel, which moves around with and supports the endless chain, may be composed of two rings or hubs, $c\ d$, furnished with flanges, and united by brace-rods $k$, and a cap, $a$; and a collar, $o$, may hold this central portion to the shaft C while it freely turns thereon. The arms or spokes D E of the sprocket-wheel are so arranged as to brace each other—that is to say, at the hub they are spread apart, and set upon the flanges of the hub-pieces $c\ d$, having kerfs or notches therein for this purpose, as shown in Fig. 2, and they approach each other at their outer ends, so that both shall be received in and be held by the sockets of the forks $f$ in pairs; and their ends are tied together throughout the series by tie-rods $m$. The forks $f$, as shown at Fig. 3, have steel or chilled wheels $e\ e$ arranged in their crotch, so that the chain F may bear against them instead of against the fork, and thus save the fork from being cut or worn by the chain. The chain, both in entering and leaving the forks, slightly turns these wheels $e$, and thus causes them to be constantly presenting a new surface-bearing to the chain, which saves the forks from cutting and wearing away. The chain F, after it leaves the fork $f'$, passes around a pulley, G, arranged on a pivoted arm, $g$, that is controlled by a spring, $h$, the object of this arrangement being to take up any slack that there may be in the chain. From the pulley G the chain passes between the pulleys $i\ i$, which prevent or run out any kink or twist that may accidentally get into the chain. From thence the chain passes in a spiral direction around the two shafts or drums O P in grooves formed therein, making several turns, (two or more,) and thence between the guiding-pulleys $i'\ i'$, and to the fork $f''$, and around the series of forks, as shown. The shafts or drums O P have their journals set in adjustable boxes, and may have some slight movement toward each other from the strain upon the chain that encircles or enwraps them; but instead of this strain coming upon their journals, it is transferred by means of the collars $n\ n$ to the collars $r\ r$, or perimeter of the power-transmitting shaft or drum M, upon the end of which there may be a band or crank wheel, N, to take the power to any machinery to be driven by the horse-power. The friction between the collars $n\ n$ and $r\ r$, while not impeding the chain further than to get the force of the team upon it, creates great force or power in the drum or shaft M, and makes a highly valuable horse-power. Instead, however, of accumulating and imparting the power by friction, toothed or cogged gearing may be used without departing from the general characteristic of the invention.

Having thus fully described my invention, what I claim is—

1. In combination with an endless-chain horse-power, the enwrapping or encircling of two or more wheels, shafts, or drums by said chain, for the purpose of communicating the power of the animal or animals through the chain to said wheels, shafts, or drums, substantially as described.

2. The arrangement by which one or more friction-wheels, shafts, or drums are interposed between two or more wheels, shafts, or drums that are enwrapped or encircled by an endless chain, or its equivalent, for the purpose of lessening the friction of their axles, whether the force of the endless chain is transmitted by the friction of contact, or by toothed wheels, substantially as described.

3. The fork with rollers inserted, for the purpose of making a changing bearing for the chain therein, substantially as described.

STUART PERRY.

Witnesses:
A. B. STOUGHTON,
DANL. ROWLAND.